(12) United States Patent
Kori et al.

(10) Patent No.: US 7,486,308 B1
(45) Date of Patent: Feb. 3, 2009

(54) IMAGE SWITCHING DEVICE AND IMAGE OUTPUTTING DEVICES

(75) Inventors: Toshiyuki Kori, Osaka (JP); Haruo Isaka, Kyoto (JP); Kenichi Honjo, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 09/744,395

(22) PCT Filed: May 23, 2000

(86) PCT No.: PCT/JP00/03271

§ 371 (c)(1),
(2), (4) Date: Apr. 11, 2001

(87) PCT Pub. No.: WO00/72597

PCT Pub. Date: Nov. 30, 2000

(30) Foreign Application Priority Data

May 24, 1999 (JP) .................................. 11-142845
Oct. 14, 1999 (JP) .................................. 11-292060

(51) Int. Cl.
*H04N 7/18* (2006.01)
*H04N 5/95* (2006.01)

(52) U.S. Cl. ........................... 348/143; 348/159; 386/98

(58) Field of Classification Search ................... 386/46, 386/98; 348/143, 153, 159, 154, 156
See application file for complete search history.

(56) References Cited

U.S. PATENT DOCUMENTS

| 4,670,786 | A | 6/1987 | Ricciardi |
| 5,715,475 | A | 2/1998 | Munson et al. |
| 5,870,139 | A | 2/1999 | Cooper et al. |
| 6,138,196 | A | 10/2000 | Takayama et al. |
| 6,282,597 | B1 | 8/2001 | Kawamura |
| 2004/0085447 | A1* | 5/2004 | Katta et al. ................. 348/143 |

FOREIGN PATENT DOCUMENTS

| JP | 5-83632 | 4/1993 |
| JP | 7-264219 | 10/1995 |
| JP | 10-126426 | 5/1998 |

(Continued)

OTHER PUBLICATIONS

European Office Action issued in Patent Application No. 00 929 827.4-1241 dated on Nov. 11, 2008.

*Primary Examiner*—Vincent F Boccio
(74) *Attorney, Agent, or Firm*—McDermott Will & Emery LLP

(57) ABSTRACT

An image switching device for connecting to a plurality of image output devices via a digital interface having the capability of selecting image outputs sequentially of the image outputting devices. Cameras (101 to 104) are connected to a camera switching device (105) via an IEEE 1394 standard-based digital interface (114). Synchronizing timing signals transmitted in isochronous communication packets from the camera switching device (105) are synchronized with image signals on the camera (101 to 104) sides, each camera (101 to 104) transmits its image signals in synchronous communication packets based on image switching control data transmitted in asynchronous communication packets or isochronous communication packets from a camera switching control unit (106), and the camera switching device (105) selectively receives image data transmitted from a desired camera based on image switching control data.

7 Claims, 17 Drawing Sheets

FOREIGN PATENT DOCUMENTS

| | | |
|---|---|---|
| JP | 10-155121 | 6/1998 |
| JP | 10-155188 | 6/1998 |
| JP | 10-178686 | 6/1998 |
| JP | 10-285664 | 10/1998 |
| JP | 10-303945 | 11/1998 |
| JP | 10-313448 | 11/1998 |
| JP | 11-127214 | 5/1999 |

* cited by examiner

IMAGE SWITCHING DEVICE AND IMAGE OUTPUTTING DEVICES

TECHNICAL FIELD

The present invention relates to an image switching device for switching plural image signals delivered from an image outputting device such as television camera, in a digital interface such as IEEE1394 bus, selecting desired image signals, and sending out to VTR or display unit, and an image outputting device connected to the image switching device.

BACKGROUND ART

FIG. 17 is a block diagram of an image recording and reproducing apparatus for monitoring by using a hitherto well-known image switching device. In FIG. 17, image signals taken out from plural cameras CM1 to CMN are sequentially switched by control signals from a control circuit 7 in every frame by a switch (SW) 1 as a frame switcher, and put into a recording signal processing circuit 3. In the recording signal processing circuit 3, input image signals are processed by continuity hold in odd and even fields and subcarriers, and are converted into recording signals to be recorded in a VTR 6. The recording signals taken out from the recording signal processing circuit 3 are put into a superimposing circuit 4, while the camera number identification signal issued from the control circuit 7 is fed into the superimposing circuit 4, in which it is superimposed in a vertical blanking period of the recording signal. The camera number identification signal taken out from the control circuit 7 is an identification signal synchronized with the switch 1 and corresponding to the output side camera. The recording signal on which the camera number identification signal is superimposed is delivered from the superimposing circuit 4, and is recorded in the VTR 6.

On the other hand, by a switch (SW) 2 independent of the switch 1, an image signal of other camera than the one for recording into the VTR 6 can be selected and monitored by the monitor 5. Reference numeral 8 shows switch (SW)1 and switch (SW) 2 as one switching device.

An example of image switching device and image outputting device is disclosed in Japanese Laid-open Patent No. 5-83632. This device includes a frame switcher for switching image signals from plural television cameras in every frame, and sending out.

In the conventional image switching device, when recording or monitoring the image signals obtained from plural cameras, a frame switcher is required in order to select image signals from a desired camera sequentially. Or when monitoring a desired camera always while recording image signals from plural cameras, a frame switcher of an independent system is needed. That is, the frame switcher is required to have two systems, that is, a switch for selecting sequentially and a switch for selecting an image output from a desired camera arbitrarily.

Further, to synchronize a plurality of cameras, a synchronous timing signal must be supplied in each camera independently, or a memory or the like must be provided in the frame switcher to synchronize them.

DISCLOSURE OF THE INVENTION

To solve the problems, it is hence an object of the invention to present an image switching device connected to plural image outputting devices (for example, cameras), a VTR and a monitor, and having a switcher function for synchronizing the plural image outputting devices and selecting image signal outputs issued from the image outputting devices sequentially, and image outputting devices to be connected to this image switching device. That is, the invention has features of two devices, that is, the image switching device and image outputting device.

To achieve the object, the image switching device in one aspect of the invention is connected to plural image outputting devices through a digital interface. The digital interface is preferred to be an IEEE1394 bus conforming to the IEEE1394 standard.

The image switching device comprises image switching control means. The image switching control means issues image switching control data for switching a desired outputting device out of the plural image outputting devices by issuing a desired image signal through the digital interface.

The image switching control data includes the data instructing whether or not to deliver a stream by which channel by using which image outputting device out of plural image outputting devices (for example, cameras). That is, the image switching control data contains the device number for identifying plural image outputting devices, channel for stream, and on/off information of stream, and such information is transmitted by isochronous packet communication or asynchronous packet communication.

The definition of the term "stream" is known well among those skilled in the art, and in this invention the term "stream" corresponds to the image signal to be transmitted and received between the image switching device and image outputting device through the digital interface.

The image switching device includes, aside from the image switching control means, image signal selecting means for selecting and receiving image signals sent from the image outputting devices in response to the switching control data. For the image signal selecting means, a digital interface is used, in particular, isochronous packet communication or asynchronous packet communication suited to the IEEE1394 bus conforming to the IEEE1394 standard.

Further, the image switching device of the invention includes, aside from the image switching control means and image signal selecting means, synchronous signal transmitting means for transmitting synchronizing timing signals for synchronizing the image outputting devices.

The image signal selecting means of the image switching device of the invention includes receiving means of isochronous packet communication or asynchronous packet communication. The synchronous signal transmitting means for transmitting synchronizing timing signals can use, for example, frame synchronizing signals at frequency of 30 hertz as reference signals.

The image outputting device in other aspect of the invention is a device to be connected to the image switching device through a digital interface, and comprises receiving means for receiving image switching control data transmitted from the image switching device, synchronous signal regenerating means for regenerating the synchronizing timing signal transmitted from the image switching device, and image signal transmitting means for synchronizing the synchronous signal from the synchronous signal regenerating means and the image signal, and transmitting the image signal corresponding to the image switching control data from the image switching device. The image outputting devices of the invention are also preferred to be connected to the IEEE1394 bus.

The receiving means for receiving the image switching control data and the image signal transmitting means for transmitting corresponding to the image switching control data from the image switching device transmit by isochronous packet communication. That is, between the image outputting device and image switching device of the invention, the synchronizing timing signal, image signal, and image switching control data are exchanged by the isochronous packet communication through the digital interface, while the image switching control data may be transmitted by the asynchronous packet communication.

The image outputting device of the invention is connected to the image switching device through the digital interface, in particular, the IEEE1394 bus, but as the image switching device, it is preferred to use the image switching device disclosed in the invention.

BEST MODE FOR CARRYING OUT THE INVENTION

Embodiment 1

Figure 1:
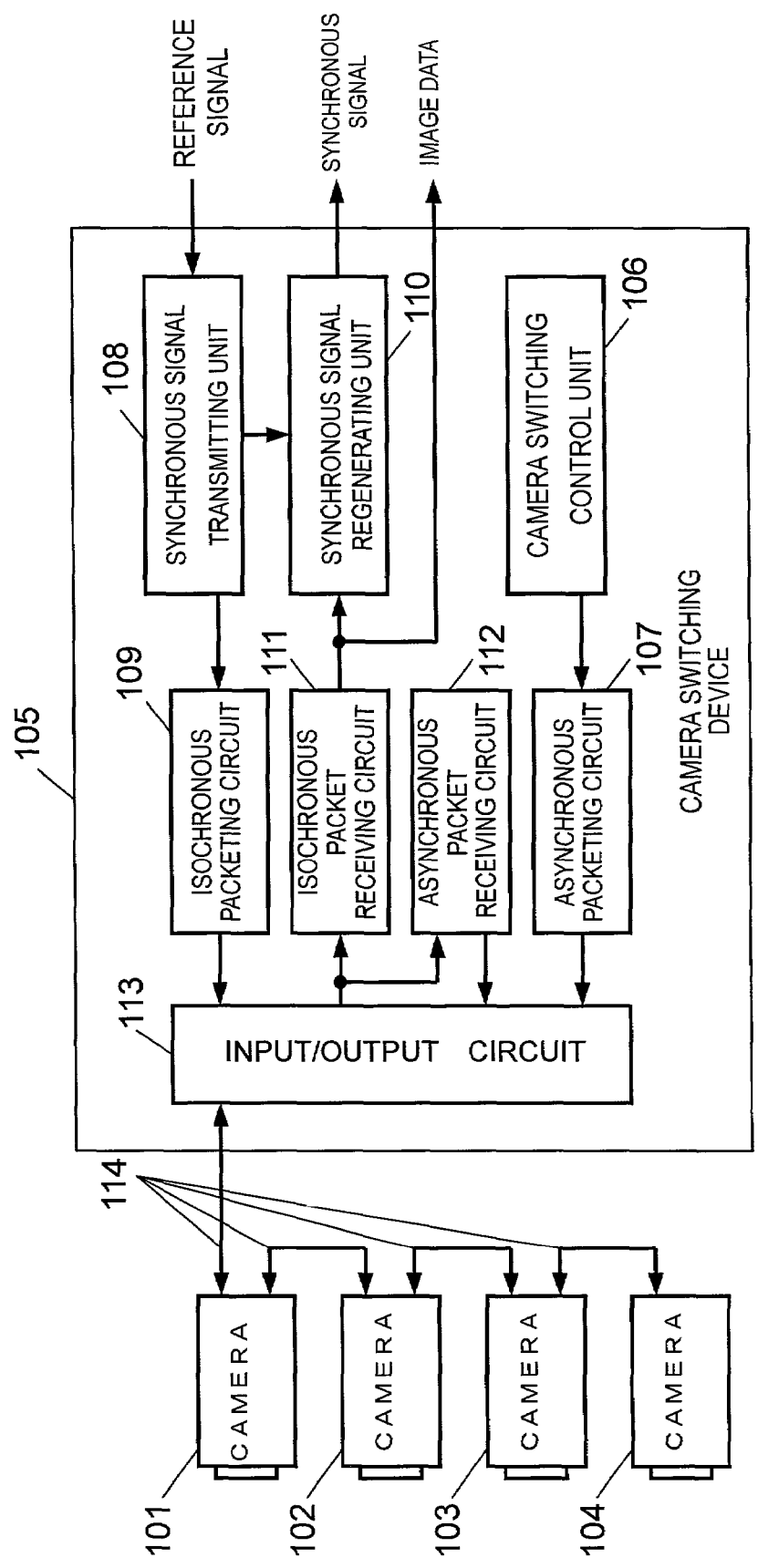
FIG. 1 is a block diagram showing a configuration of an image switching device in embodiment 1 of the invention.

FIG. 1 is a block diagram showing a configuration of an image switching device and image outputting device in embodiment 1 of the invention. In the following explanation, cameras are used as image switching device and image outputting device, but it must be understood that the invention may be also applied in the VTR, HDD, and other media and devices handling various image signals.

Referring to FIG. 1, four cameras 101 to 104, and a camera switching device 105 are connected through a digital interface (DIF) 114. The DIF 114 is preferably an IEEE1394 bus conforming to the IEEE1394 standard.

The camera switching device 105 corresponds to the image switching device in the invention, and specifically it comprises a camera switching control unit 106 for giving camera image switching control data for switching the cameras 101 to 104, an asynchronous packeting circuit 107 for converting the camera image switching control data to an asynchronous communication packet, a synchronous signal transmitting unit 108 for transmitting a synchronizing timing signal for synchronizing the cameras 101 to 104, an isochronous packeting circuit 109 for converting the synchronizing timing signal taken out from the synchronous signal transmitting unit 108 to an isochronous communication packet, an input/output circuit 113 for input and output of packet data through the DIF 114, an isochronous packet receiving circuit 111 for receiving the isochronous communication packet from the input/output circuit 113, an asynchronous packet receiving circuit 112 for receiving the asynchronous communication packet, and a synchronous signal regenerating unit 110 for regenerating the synchronous signal from the received isochronous communication packet.

Figure 2:
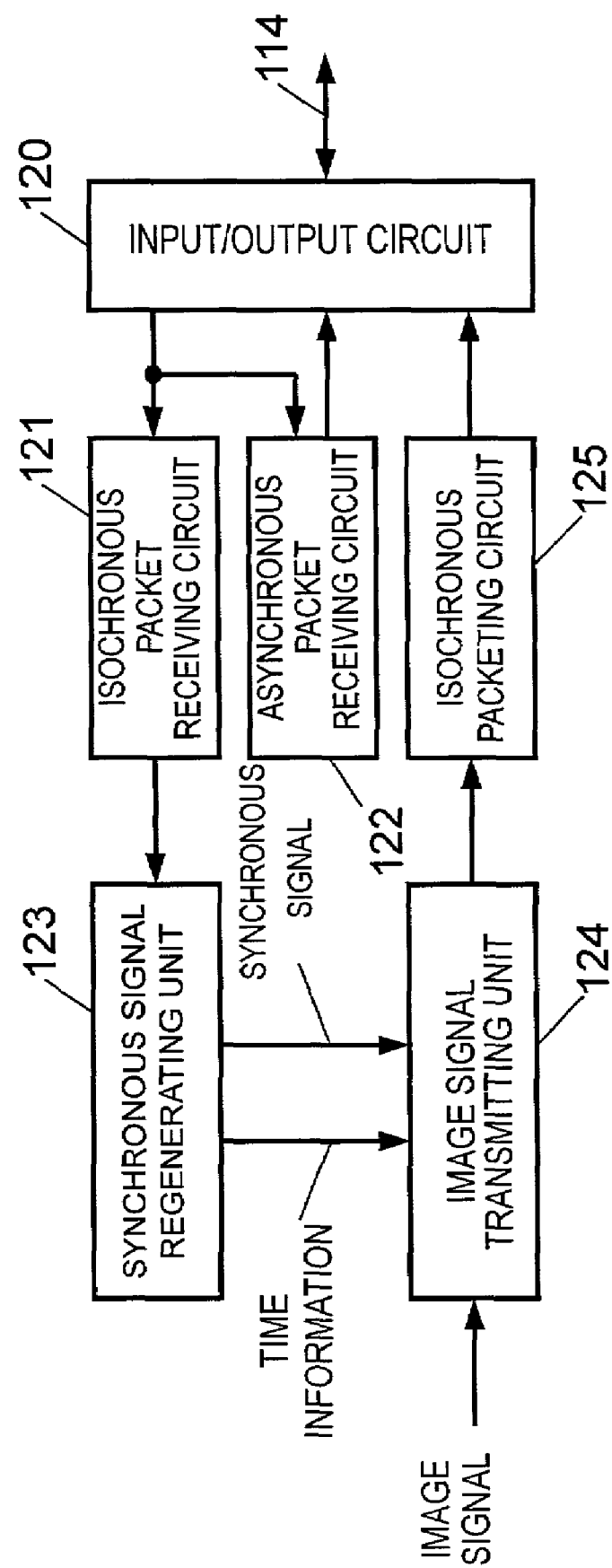
FIG. 2 is a block diagram showing a configuration of an image outputting device in embodiment 1.

FIG. 2 is a specific block diagram of the DIF 114 shown in FIG. 1 and cameras 101 to 104 connected thereto. As shown in FIG. 2, it comprises an input/output circuit 120 for packet communication through the DIF 114, an isochronous packet receiving circuit 121 for receiving the isochronous communication packet from the input/output circuit 120, an asynchronous packet receiving circuit 122 for receiving the asynchronous communication packet, a synchronous signal regenerating unit 123 for regenerating a synchronous signal from the received isochronous communication packet, an image signal transmitting unit 124 for issuing an image signal having the image signal from an image pickup unit (not shown) synchronized with the synchronous signal from the synchronous signal regenerating unit 123, and an isochronous packeting circuit 125 for converting the image signal from the image signal transmitting unit 124 to an isochronous packet.

Figure 3:
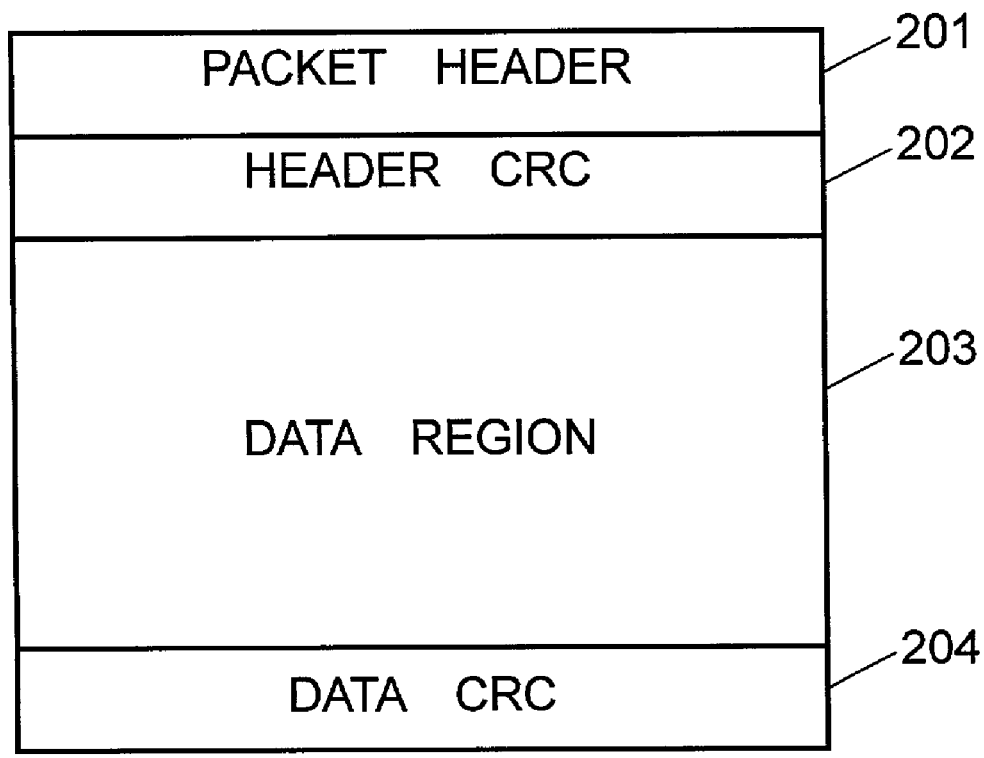
FIG. 3 is a diagram showing a format of isochronous communication packet in IEEE1394 standard.

FIG. 3 shows a format of isochronous communication packet defined in the IEEE1394 standard. The isochronous communication packet is composed of a four-byte packet header 201, a four-byte header CRC (cyclic redundancy check) 202 for checking presence or absence of transmission error of the packet header 201, a data region 203, and a four-byte data CRC 204 for checking presence or absence of transmission error in the data region 203. In the IEEE1394 standard, plural devices can transmit plural isochronous communication packets in time sharing in every about 125 microseconds (hereinafter called cycle time). To identify plural packets in a same cycle time, a channel number is given to the packet header 201 of the isochronous communication packet. The control command and others are transmitted by using the asynchronous communication packet (asynchronous packet).

Referring back to FIG. 1 and FIG. 2, when transmitting the image signal of the camera 101 to other node, for example, to the camera switching device 105 side, the image signal taken out of the camera 101 is sent to the DIF 114 through the image signal transmitting unit 124, isochronous packeting circuit 125, and input/output circuit 120. In the isochronous packeting circuit 125, the image data is divided into every specified number of bytes that can be transmitted in one cycle time, and the data header showing the type of image data is added thereto, and further necessary information for composing the isochronous communication packet of IEEE 1394 standard is added and transmitted. This packet is transmitted by using a clock which is not synchronous with the image signal issued from the image signal transmitting unit 124. Further, the camera switching is controlled by controlling the input/output circuit 114 of the camera 101 on the basis of the image switching control data received in the asynchronous communication packet.

The input/output circuit 113 of the camera switching device 105 receives the isochronous communication packet provided with the channel number to be received. The channel number is transmitted to the input/output circuit 113 from, for example, the camera switching device 105 in asynchronous communication packet. The input/output circuit 113 transmits the synchronous signal and image data restored from the isochronous communication packet to the isochronous packet receiving circuit 111, and the synchronous signal is issued from the synchronous signal regenerating circuit 110 and the image data from the isochronous packet receiving circuit 111, respectively. These issued synchronous signal and image data can be transmitted to the image outputting device or receiving device not shown in the drawing.

The synchronizing timing signal is preferred to be transmitted to all cameras 101 to 104 connected in cascade by the DIF 114, by at least one of isochronous packet communication or asynchronous packet communication not containing image data. Since the image data is not put on the IEEE1394 bus, the band of the IEEE1394 can be utilized effectively. The camera receiving the synchronizing timing signal through the DIF 114 restores the frame synchronizing timing signal in the synchronous signal regenerating unit 123 through the input/output circuit 120 and isochronous packet receiving circuit 121. By this frame synchronizing timing signal, the image signals issued from the cameras 101 to 104 can be synchronized with each other. As a result, the image signals taken by the cameras 101 to 104 are synchronized with the frame synchronizing timing signal.

The camera switching control unit 106 selects a camera to transmit to the IEEE1394 bus in every frame unit, and transmits the image switching control data by asynchronous communication packeting by the asynchronous packeting circuit 107.

Figure 4:
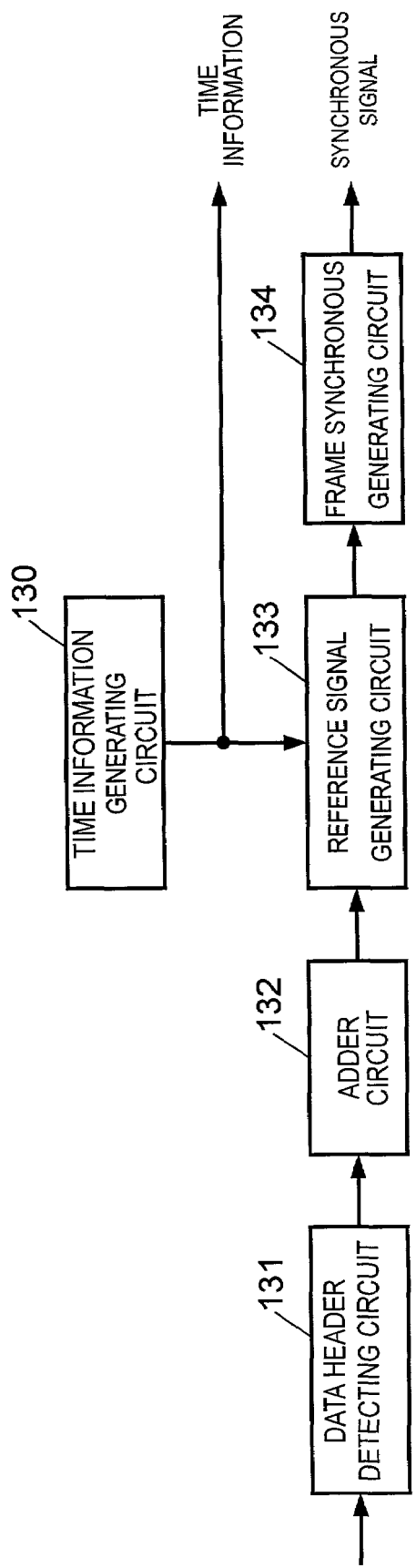
FIG. 4 is a block diagram showing a configuration of a synchronous signal regenerating unit of image in embodiment 1.
Figure 5:
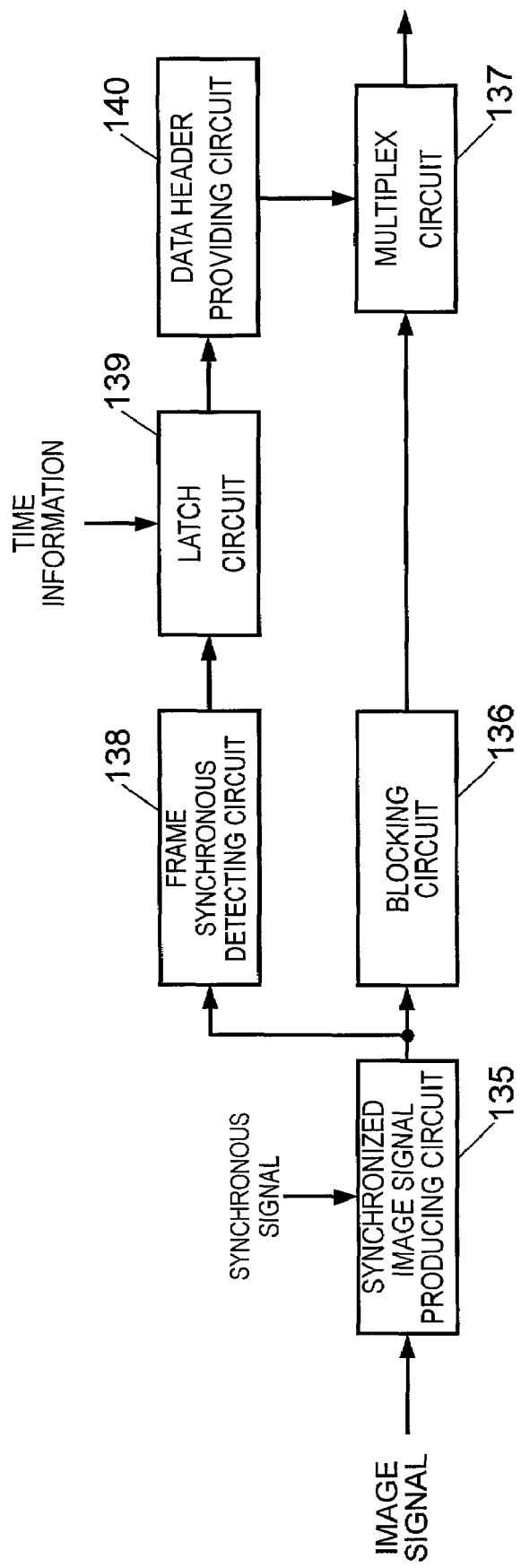
FIG. 5 is a block diagram showing a configuration of an image signal transmitting unit of camera in embodiment 1.

FIG. 4 is a block diagram showing a configuration of the synchronous signal regenerating unit 123 and FIG. 5 is a block diagram showing a configuration of the image signal transmitting unit 124. The operation of transmission is explained in the first place.

In FIG. 4, the time information generating circuit 130 uses the cycle time register specified in the IEEE1394 standard. The cycle time register is a 32-bit counter, which is a counter for counting with a clock of 24.576 MHz from 0 to 3071. The next higher 13 bits form a counter for counting a cycle of 8 kHz, which counts from 0 to 7999. The further higher 7 bits form a counter for counting from 0 to 127 in every second. All devices connected the IEEE1394 bus have such time information generating circuit 130.

Figure 6:
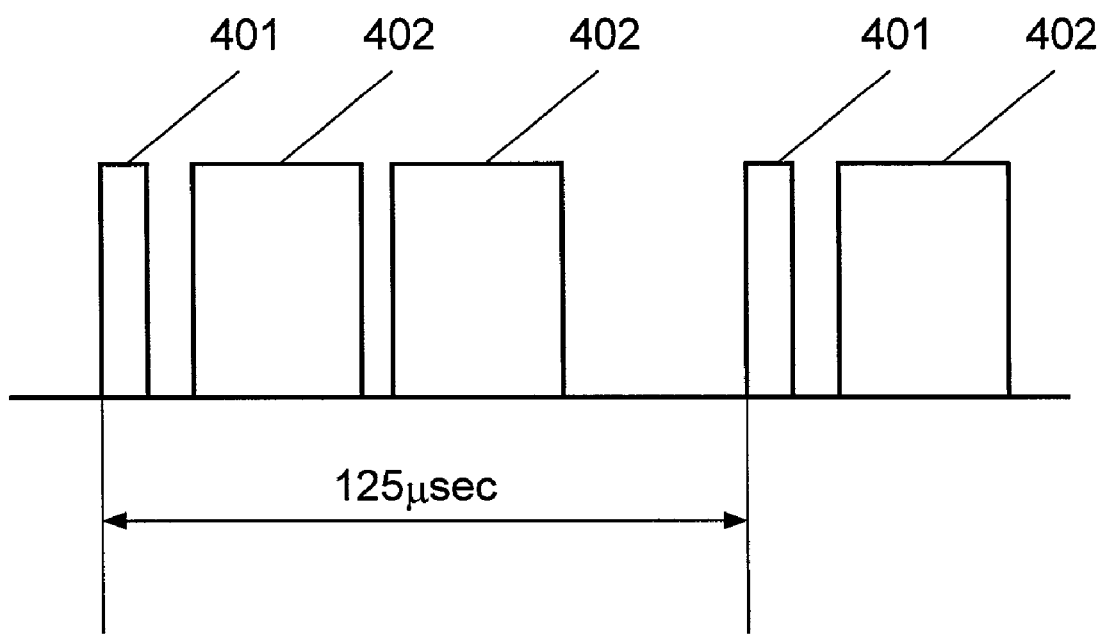
FIG. 6 is a conceptual diagram showing mode of isochronous communication in IEEE1394 standard.

Of the devices connected to the IEEE1394 bus, one device serves as a cycle master, and transmits the cycle start packet 401 to all nodes in every about 125 microseconds as shown in FIG. 6. The node for isochronous communication transmits the isochronous communication packet 402 next to the cycle start packet 401. The value of the time information generating circuit 130 provided in the device of the cycle master is transmitted to all devices of the IEEE1394 bus by the cycle start packet 401. The device receiving the cycle start packet 401 changes the value of the own time information generating circuit 130 to the value of the time information in the cycle start packet 401. Therefore, the values of the time information generating circuits 130 of all devices of the IEEE1394 bus are always matched almost completely.

A blocking circuit 136 in FIG. 5 divides the image signal by a specified number of bytes to be transmitted in one cycle time, and issues to a multiplex circuit 137 in every number of bytes. A frame synchronous detecting circuit 138 detects a frame synchronizing timing signal from the image signal, and issues to a latch circuit 139. The time information generating circuit 130 issues 20 bits out of the 32 bits of the generated time information to the latch circuit 139. The latch circuit 139 latches the output value of the time information generating circuit 130 at the beginning of the frame by the frame synchronizing timing signal detected by the frame synchronous detecting circuit 138. The latched value is issued to a data header providing circuit 140. The data header providing circuit 140 disposes the time information latched by the latch circuit 139 at a specified position in the data header, and issues to the multiplex circuit 137. The multiplex circuit 137 adds the data header to the beginning of the block data entered from the blocking circuit 136, and issues to the isochronous packeting circuit 125. The isochronous pocketing circuit 125, as shown in FIG. 3, adds the packet header 210, header CRC 202 and data CRC 204 according to the IEEE1394 standard, and issues to the input/output circuit 120.

Figure 7:
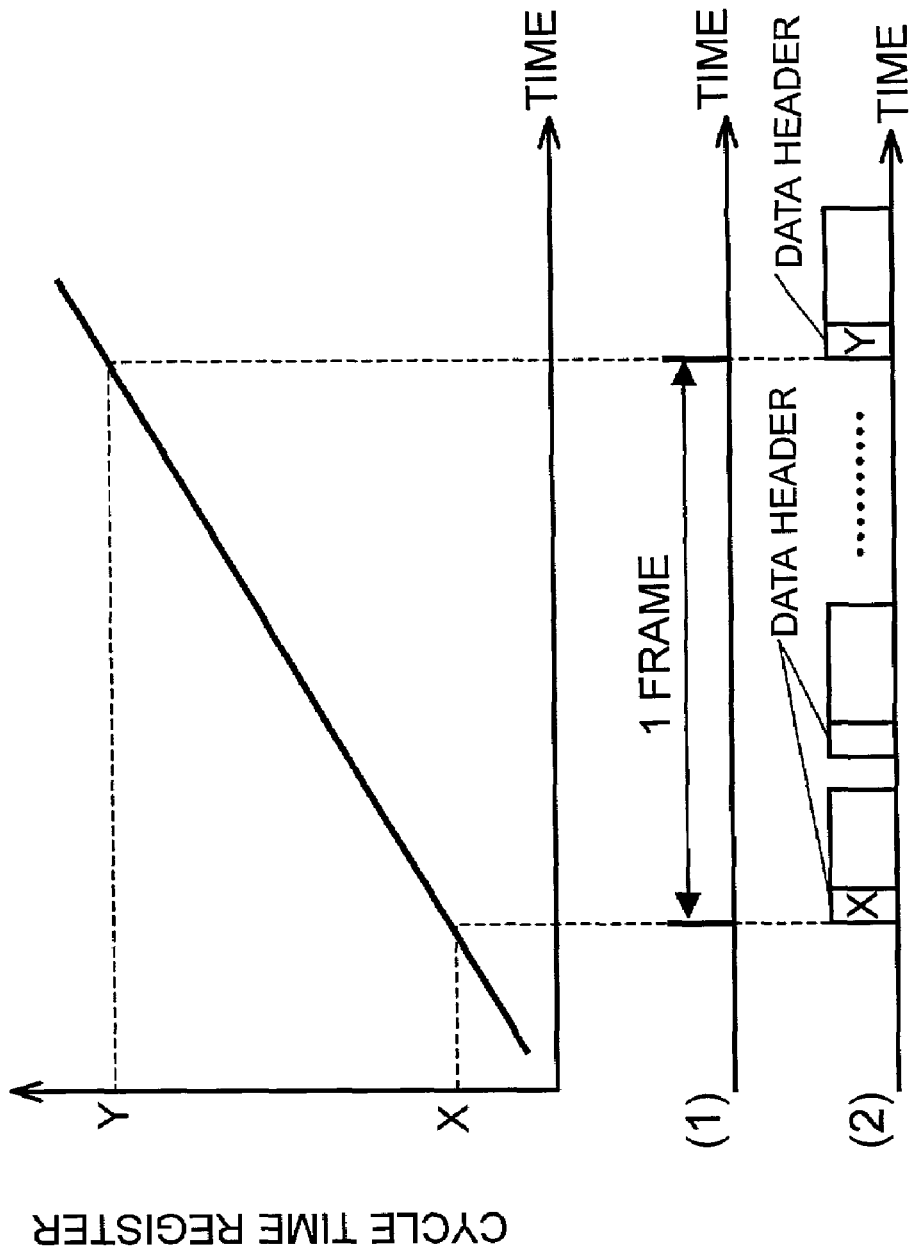
FIG. 7 is a conceptual diagram showing timing of adding time information to the data header at the transmission side in embodiment 1.

Referring now to FIG. 7, the time information generating circuit 130, latch circuit 139 and data header providing circuit 140 are further described below. The axis of ordinates in FIG. 7 denotes the count value of the cycle time register, and the axis of abscissas represents the count time, and in the diagram, further, (1) is the frame synchronous detecting signal, and (2) is the output of the multiplex circuit 137. The time information generating circuit 130 of the transmitting device, that is, the value of the cycle time register is counted up as the time passes as shown in FIG. 7. The rise pulse of the frame synchronous detecting signal indicates that its timing is the beginning of the frame. At the timing of this rise pulse, the latch circuit 139 latches the value of the time information generating circuit 130. In FIG. 7, the time for sending out the beginning packet of one frame is X or Y.

The data header providing circuit 140 adds the latched value of the time information generating circuit 130 to the data header to be added to the frame beginning packet, and does not add to other packet header. In FIG. 7, the value X and value Y are added to the data header only in the frame beginning packet.

Next, the operation in reception is explained. When receiving the packet, only the isochronous communication packet to be received from the data entered through the input/output circuit 120 is received in the isochronous packet receiving circuit 121, and is issued to the data header detecting circuit 131 after making sure there is no error in the packet. The data header detecting circuit 131 extracts the time information in the data header added in the received packet, and issues the time information to an adder circuit 132. The adder circuit 132 adds a specified value to the time information entered from the data header detecting circuit 131, and issues the sum to a reference signal generating circuit 133. The time information generating circuit 130 issues its own time information to the reference signal generating circuit 133. The reference signal generating circuit 133 compares the sum entered from the adder circuit 132 and the time information entered from the time information generating circuit 130, and generates a specified pulse when the time information entered from the time information generating circuit 130 is matched with the sum. The time information entered from the adder circuit 132 shows the timing at the beginning of the frame at the transmission side, and therefore a frame synchronous generating circuit 134 generates a frame synchronous signal by using the pulse entered from the reference signal generating circuit 133 as the reference signal. A synchronized image signal producing circuit 135 issues an image signal synchronized with this frame synchronous signal.

From the data entered through the input/output circuit 120, only the asynchronous communication packet is received in every frame in the asynchronous packet receiving circuit 122, and the image switching control data is issued to the input/output circuit 120. In the input/output circuit 120, in every frame depending on the image switching control data, the isochronous packet to be transmitted to the IEEE1394 bus is selected.

Figure 8:
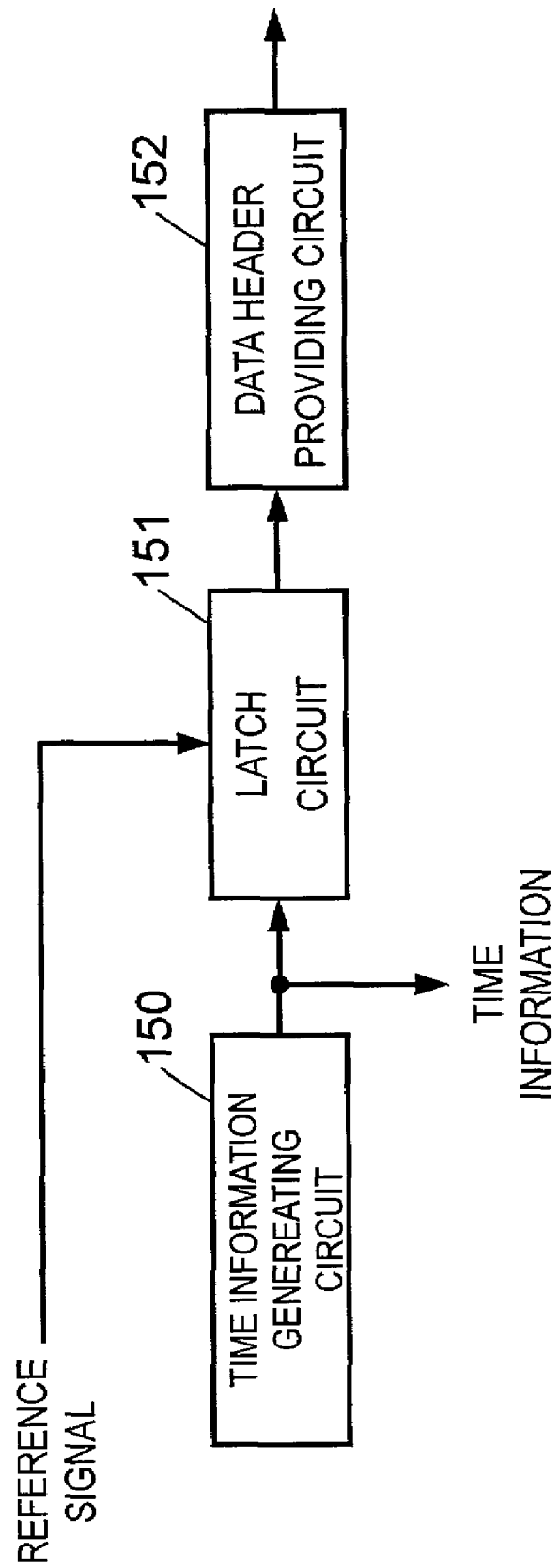
FIG. 8 is a block diagram showing a configuration of synchronous signal transmitting unit of image switching device in embodiment 1.
Figure 9:
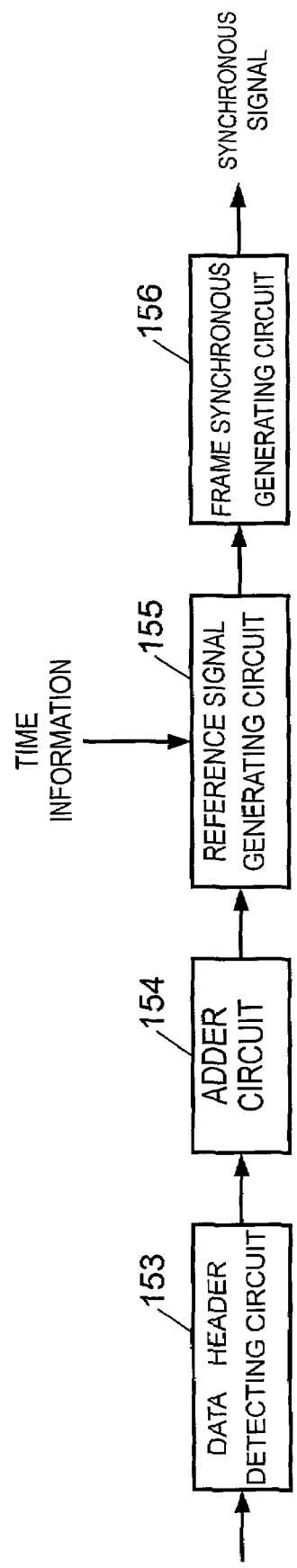
FIG. 9 is a block diagram showing a configuration of synchronous signal regenerating unit of the image switching device.

The camera switching device 105 side is explained below. FIG. 8 is a block diagram showing a configuration of the synchronous signal transmitting unit 108 and FIG. 9 is a block diagram showing a configuration of the synchronous signal regenerating unit 110. First, the operation in transmission is explained.

Same as in the explanation at the camera side, a time information generating circuit 150 uses the cycle time register specified in the IEEE 1394 standard. As a reference signal, an image synchronous signal is supplied into a latch circuit 151. The time information generating circuit 150 issues 20 bits out of 32 bits of time information to the latch circuit 151. The latch circuit 151 latches the output value of the time information generating circuit 150 by the image synchronous signal (reference signal). The latched value is issued to a data header providing circuit 152, and in the data header providing circuit 152, the time information latched in the latch circuit 151 is disposed at a specified position in the data header, and is issued to the isochronous packeting circuit 109. The isochronous packeting circuit 109 adds the packet header 201, header CRC 202 and data CRC 204 according to the IEEE1394 standard as shown in FIG. 3, and issues to the input/output circuit 113.

Thus, in the camera switching device 105, by adding the frame synchronizing timing signal on the basis of a specified reference signal to the data header of the isochronous communication packet in which the image data is not multiplexed, it is transmitted to all cameras 101 to 104 connected through the DIF 114.

The image switching control data issued from the camera switching control unit 106 is fed into the asynchronous packeting circuit 107 in every frame, and is transmitted to the IEEE1394 bus through the input/output circuit 113 by the asynchronous communication packet.

Next, the operation in reception is explained. When receiving the packet, only the isochronous communication packet to be received from the data entered through the input/output circuit 113 is received in the isochronous packet receiving circuit 111, and after making sure there is no error in the packet, it is issued as image data to a data header detecting circuit 153 in the synchronous signal regenerating circuit 110. The data header detecting circuit 153 extracts the time information in the data header added in the received packet, and issues the time information to an adder circuit 154. The adder circuit 154 adds the specified value to the time information entered from the data header detecting circuit 153, and issues the sum to a reference signal generating circuit 155. The time information generating circuit 150 issues its own time information to the reference signal generating circuit 155. The reference signal generating circuit 155 compares the sum entered from the adder circuit 154 and the time information entered from the time information generating circuit 150, and generates a specified pulse when the time information entered from the time information generating circuit 150 is matched with the sum. Since the time information entered from the adder circuit 154 shows the frame beginning timing at the transmission side, and hence a frame synchronous generating circuit 156 generates a specified synchronous signal synchronized with the frame synchronous signal used inside the device on the basis of the pulse entered from the reference signal generating circuit 155 as the reference signal.

Moreover, by receiving only the asynchronous communication packet to be received from the data entered through the input/output circuit 113 in the asynchronous packet receiving circuit 112, the image switching control data is issued to the input/output circuit 113. As a result, the receiving channel can be selected in every frame, and the image can be switched by the receiving channel. That is, the asynchronous packet receiving circuit 112 has a function of image signal selecting means of the invention together with the input/output circuit 113.

Figure 10:
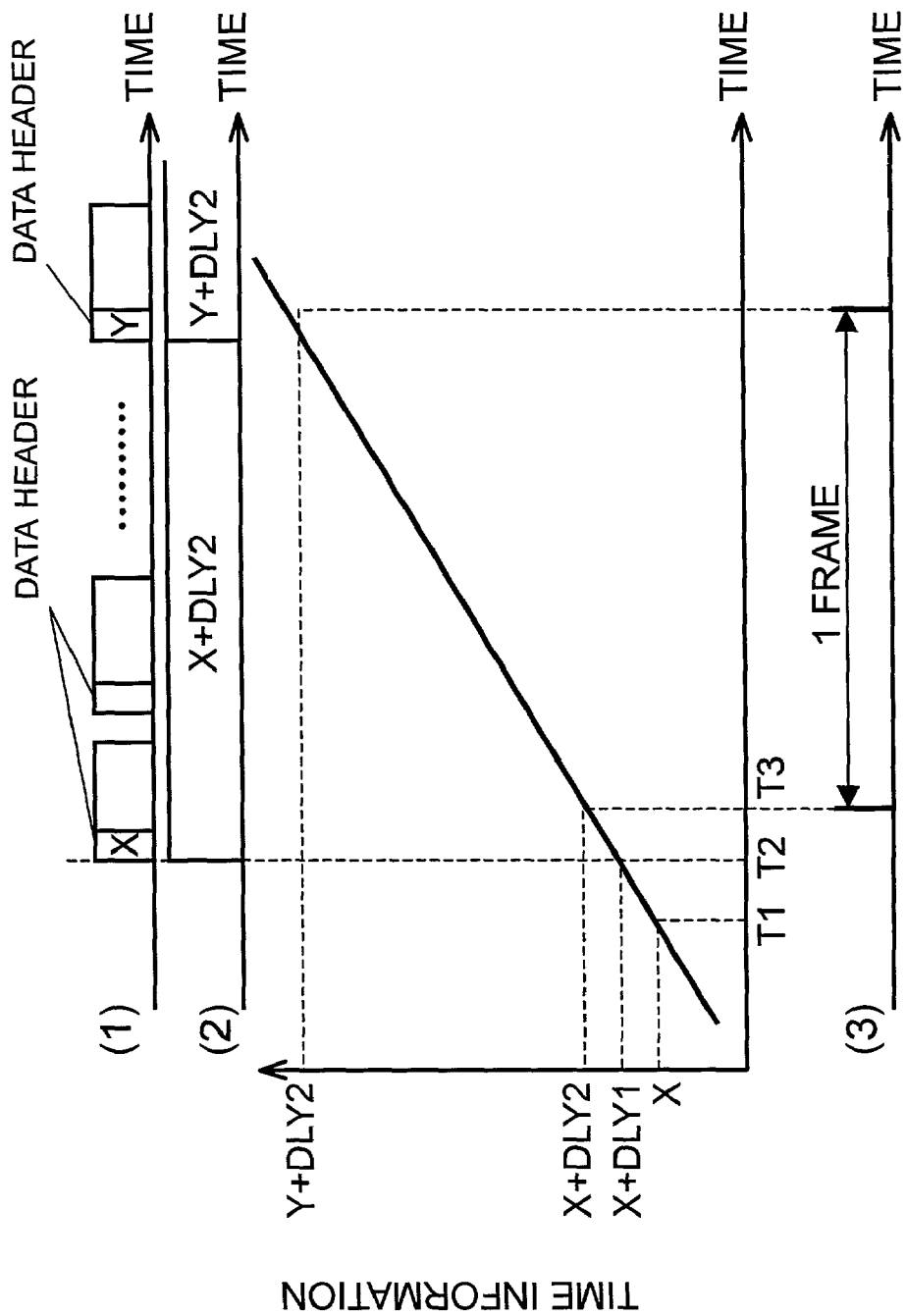
FIG. 10 is a conceptual diagram showing timing for generating reference signal at reception side in embodiment 1.

Referring now to FIG. 10, the operation of the adder circuit 154 and reference signal generating circuit 155 is explained. In FIG. 10, the axis of ordinates denotes the value of time information of the receiver, and the axis of abscissas represents the time, and in the diagram, moreover, (1) is the reception data, (2) is the output of the adder circuit 154, and (3) is the reception frame synchronous signal. By nature, the time information indicates the same value in all devices, and when the receiving device received, the value of the time information of the receiving device is already larger than the time information in the packet added to the latch at the time of transmission due to the transmission delay in the IEEE1394 bus.

In FIG. 10, it is time T1 when the transmitting device has latched the value X of the time information added in the packet. When the receiving device has received this packet at time T2, the value of the time information of the receiving device is X+DLY1, and hence the value of the internal time information is larger than the time information of the received packet. On the other hand, the reference signal generating circuit 155 generates a rise pulse as reference signal when the value of the time information of the receiving device is matched with the value of the time information added in the received packet. Therefore, when received, the value of the time information in the device is already larger than the value of the received time information, and therefore the reference signal generating circuit 155 cannot generate pulse. Hence, time DLY2 corresponding to the time since the transmission side has latched the time information of the transmitting device until the receiving device compares in the reference signal generating circuit 155 is added in the adder circuit 154, and the reference signal generating circuit 155 compares this sum and the value of the time information in the receiving device. As a result, the reference signal generating circuit 155 generates a rise pulse as reference signal at time T3.

Figure 11:
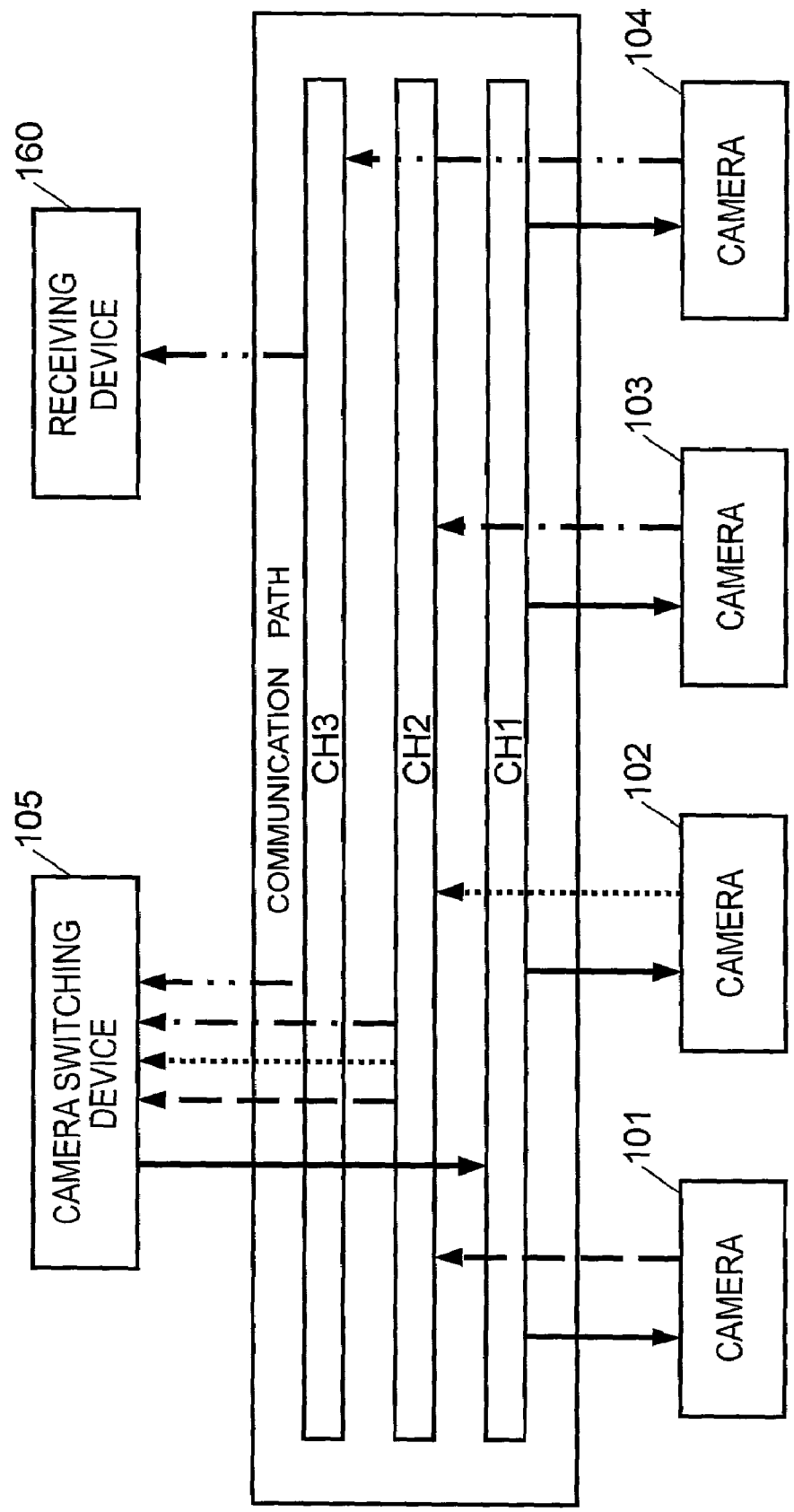
FIG. 11 is a conceptual diagram showing channels and connection state in IEEE1394 bus in embodiment 1.
Figure 12:
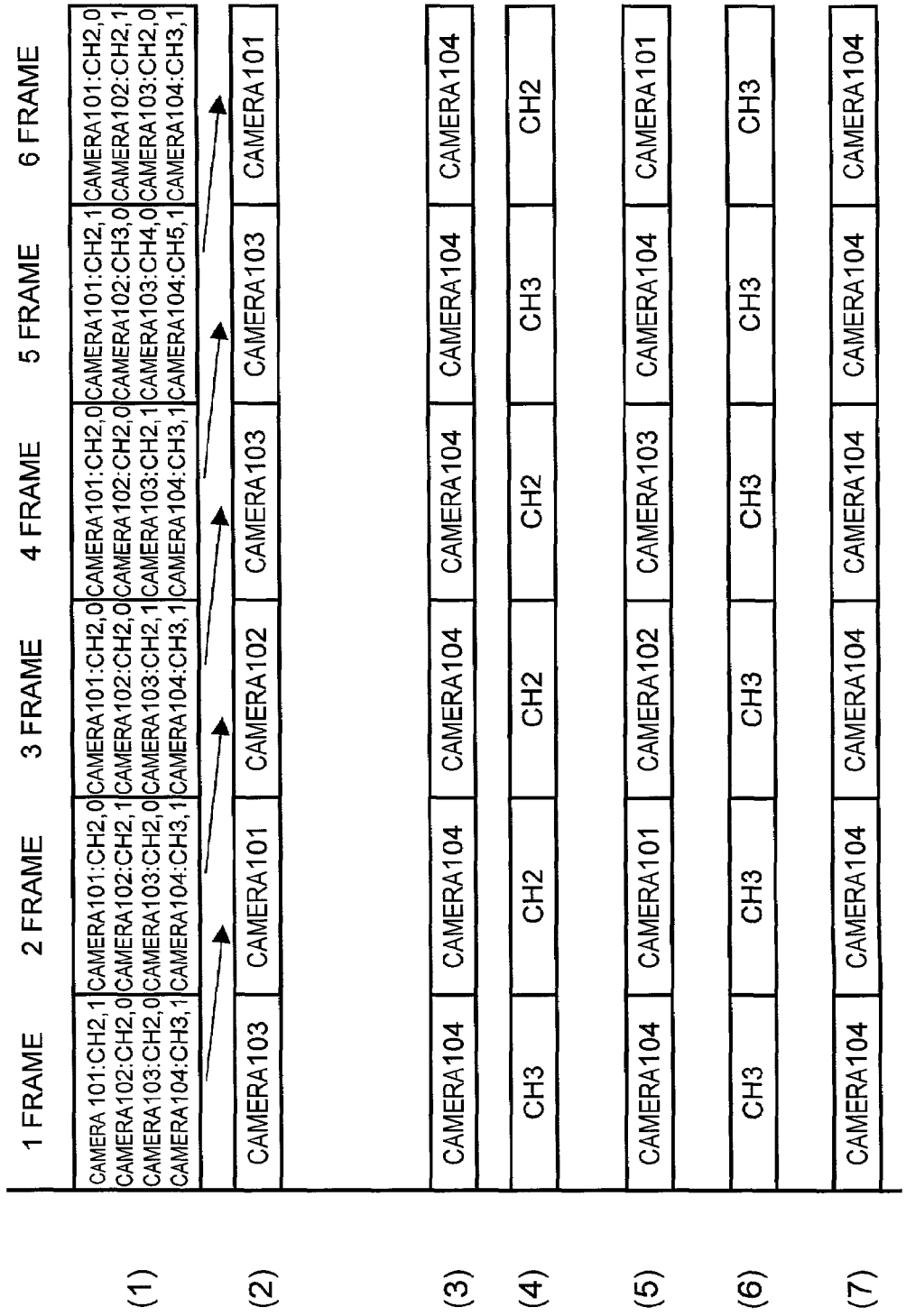
FIG. 12 is an operation timing diagram of image switching in three channels in embodiment 1.

Referring to FIG. 11 and FIG. 12, a case of monitoring always is explained, in which the camera switching device 105 switches the cameras 101 to 104 sequentially in every frame and receives, and one specific camera is received in a specific receiving device (for example, a monitor).

In the IEEE1394 standard, 64 transmission channels are prepared from 0 to 63, and there are a broadcast mode for transmitting data from a specific node to all nodes connected to the IEEE1394 bus through these channels, and a mode for connecting between a specific node and other specific node.

In FIG. 11, image signals (image data) from cameras 101 to 103 are transmitted to the camera switching device 105 through communication path CH2 by isochronous communication packet. The image data from the camera 104 is transmitted to the camera switching device 105 and receiving device 160 through the communication path CH3 by isochronous communication packet.

From the camera switching device 105, the frame synchronizing timing signal on the basis of the specified reference signal is transmitted to the cameras 101 to 104 and receiving device 160 in the broadcast mode through the communication path CH1 by isochronous communication packet.

FIG. 12 shows its operation, in which (1) is an image switching signal transmitted asynchronously, (2) is a stream transmitted in CH2, (3) is a stream transmitted in CH3, (4) is a receiving channel in the camera switching device 105, (5) is a receiving image in the camera switching device 105, (6) is a receiving channel in the receiving device 160, and (7) is a receiving image in the receiving device 160.

In FIG. 11, on the basis of the synchronous signal transmitted from the camera switching device 105 to each camera in the broadcast mode by isochronous communication packet, the cameras 101 to 104 transmit synchronized image data. Accordingly, as shown in FIG. 12 (1), the image switching signal is transmitted from the camera switching device 105 by asynchronous communication packet. The image switching signal shows the channel to be transmitted by each camera, and the number of frames to be delivered. For example, in the first frame, it is set to issue one frame in CH2 to the camera 101, zero frame in CH2 to the camera 102, zero frame in CH2 to the camera 103, and one frame in CH3 to the camera 104.

As a result, as shown in FIG. 12 (2), in CH2, according to the camera switching signal set at the first frame, the image data of the camera 101 is transmitted by one frame in CH2 in the second frame, and in the third frame, according to the camera switching signal set at the second frame, the image data of the camera 101 is stopped and the image data of the camera 102 is transmitted by one frame in CH2. In CH3, the camera 104 is always issued. By repeating the reception channels of the camera switching device 105 as CH2, CH2, CH2, CH3 as shown in FIG. 12 (4), the cameras 101 to 104 can be switched and issued sequentially in each frame including the camera 104 which is always issuing in CH3 as shown in FIG. 12 (5).

In the receiving device 160, as shown in FIG. 12 (6), by always selecting CH3, the output of the camera 104 can be always obtained.

That is, as shown in FIG. 11 and FIG. 12, in CH2, the second frame transmits by one frame of the camera 101, and the next third frame by one frame of the camera 102, and similarly the fourth frame by one frame of the camera 103, and in the fifth frame, one frame of the camera 103 is transmitted again in CH2 so that the camera switching device 105 may receive the image data of the camera 104 in CH3. The same operation is repeated hereinafter. In CH3, always the camera 104 is transmitted. Therefore, the camera switching device 105, as shown in FIG. 11 and FIG. 12 (4), (5), the second frame to the fourth frame receive the cameras 101 to 103 in CH2, and in the fifth frame, the camera 104 receives by changing over the reception channel from CH2 to CH3. The same operation is repeated hereinafter. On the other hand, the receiving device 160 can always receive the camera 104 in CH3 as shown in FIG. 11 and FIG. 12 (6), (7).

In FIG. 11 and FIG. 12, meanwhile, the image signals from the cameras 101 to 103 are multiplexed by time sharing, but, for example, if there is a sufficient allowance in the usable band of the IEEE1394 bus, it may be realized by the reception channels only by setting the output channels of the cameras 101 to 104 in CH2 to CH5 respectively.

Figure 13:
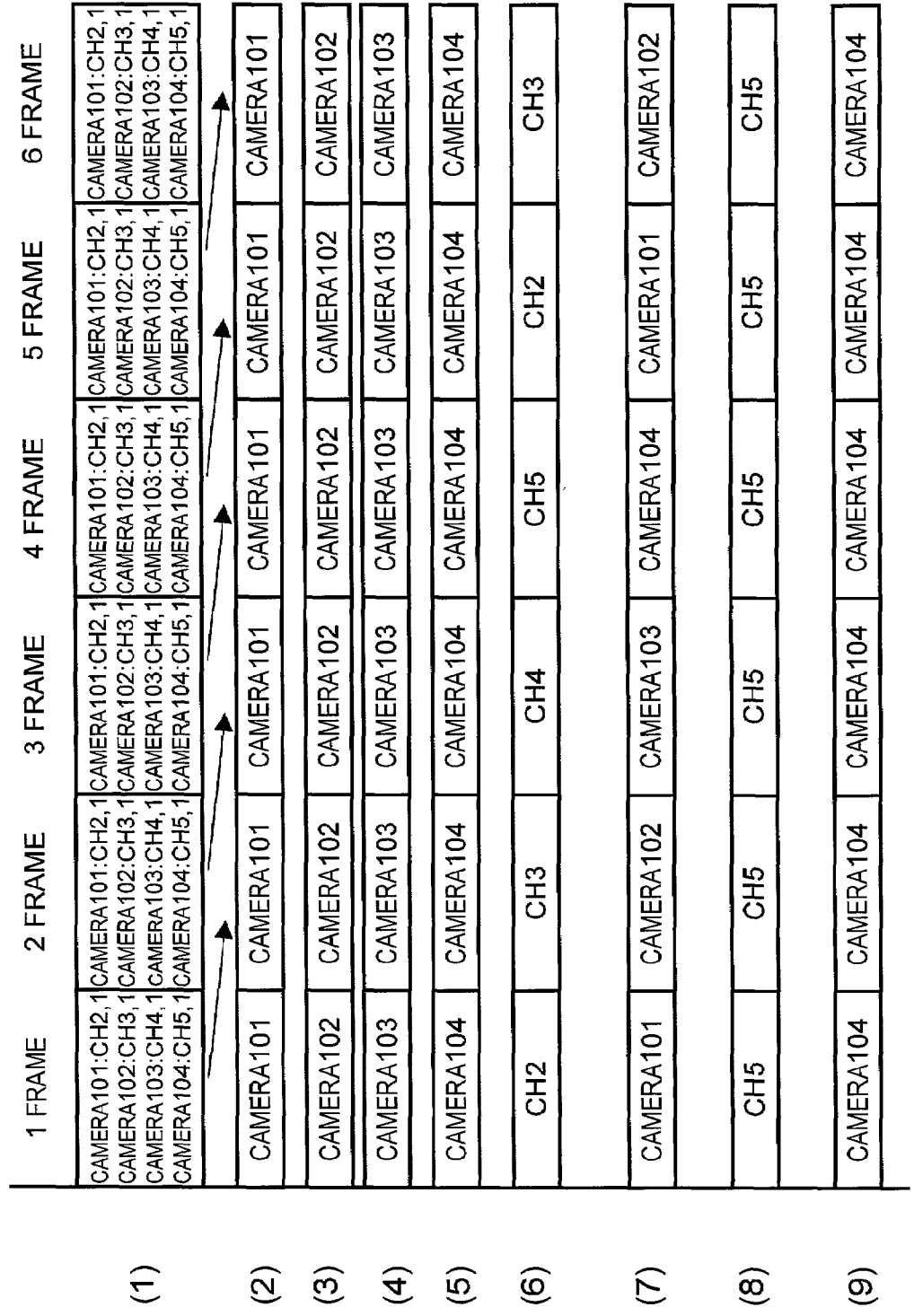
FIG. 13 is an operation timing diagram of image switching in five channels in embodiment 1.

FIG. 13 shows its practical example, and as shown in (1), the camera switching device 105 transmits image switching signals in the asynchronous communication packet so as to transmit in each frame in CH2 to CH5, to the cameras 101 to 104. As a result, as shown in FIG. 13 (2) to (5), the signal of each camera is transmitted to each channel. In the camera switching device 105, as shown in FIG. 13 (6), the reception channel is changed over, and as shown in FIG. 13 (7), the outputs of the cameras 101 to 104 can be switched sequentially, and issued.

In the receiving device 160, for example, as shown in FIG. 13 (8), by selecting always the channel 5 (CH5), the image of the camera 104 can be always received as shown in FIG. 13 (9).

Embodiment 2

Figure 14:
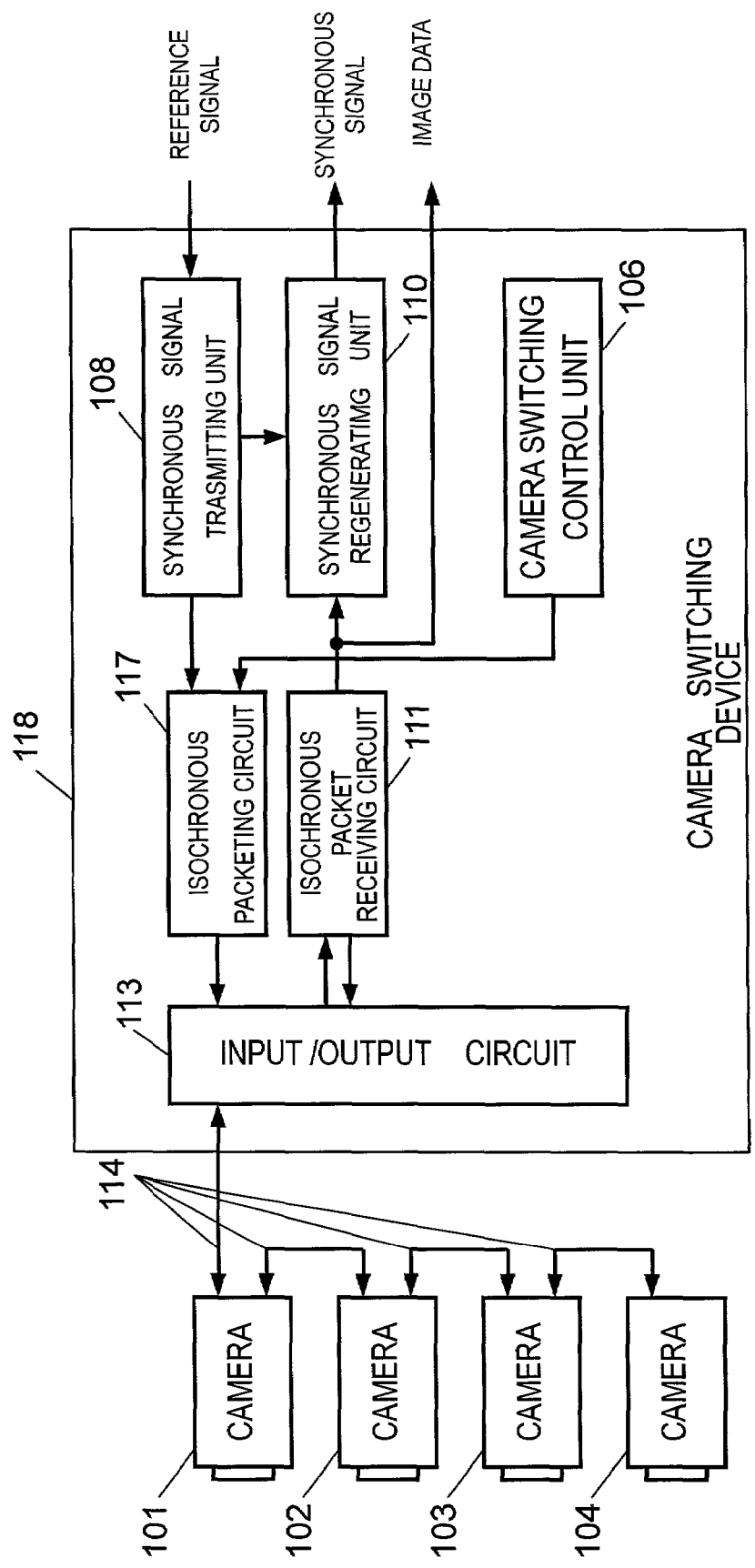
FIG. 14 is a block diagram showing a configuration of image switching device in embodiment 2 of the invention.

FIG. 14 is a block diagram showing a configuration of cameras 101 to 104 and camera switching device 118 according to embodiment 2 of the invention. In embodiment 2, not using the asynchronous packeting circuit 107 in embodiment 1, the isochronous packeting circuit 109 for converging the synchronizing timing signal to isochronous communication packet is replaced by an isochronous packeting circuit 117 for converting synchronizing timing signal and camera control data to isochronous packet.

Four cameras 101 to 104 and camera switching device 118 are connected through digital interface (DIF) 114. The DIF 114 is an interface conforming to the IEEE1394 standard.

The camera switching device 118 comprises a camera switching control unit 106 for issuing image switching control data for switching the camera, a synchronous signal transmitting unit 108 for receiving a reference signal (for example, frame synchronous signal) for synchronizing the cameras and transmitting synchronizing timing signal, an isochronous packeting circuit 117 for converting synchronizing timing signal and camera switching control data to isochronous communication packet, an input/output circuit 113 for input and output of packet data through the DIF 114, an isochronous packet receiving circuit 111 for receiving isochronous communication packet from the input/output circuit 113, and a synchronous signal regenerating unit 110 for regenerating synchronous signal from the received isochronous communication packet.

Figure 15:
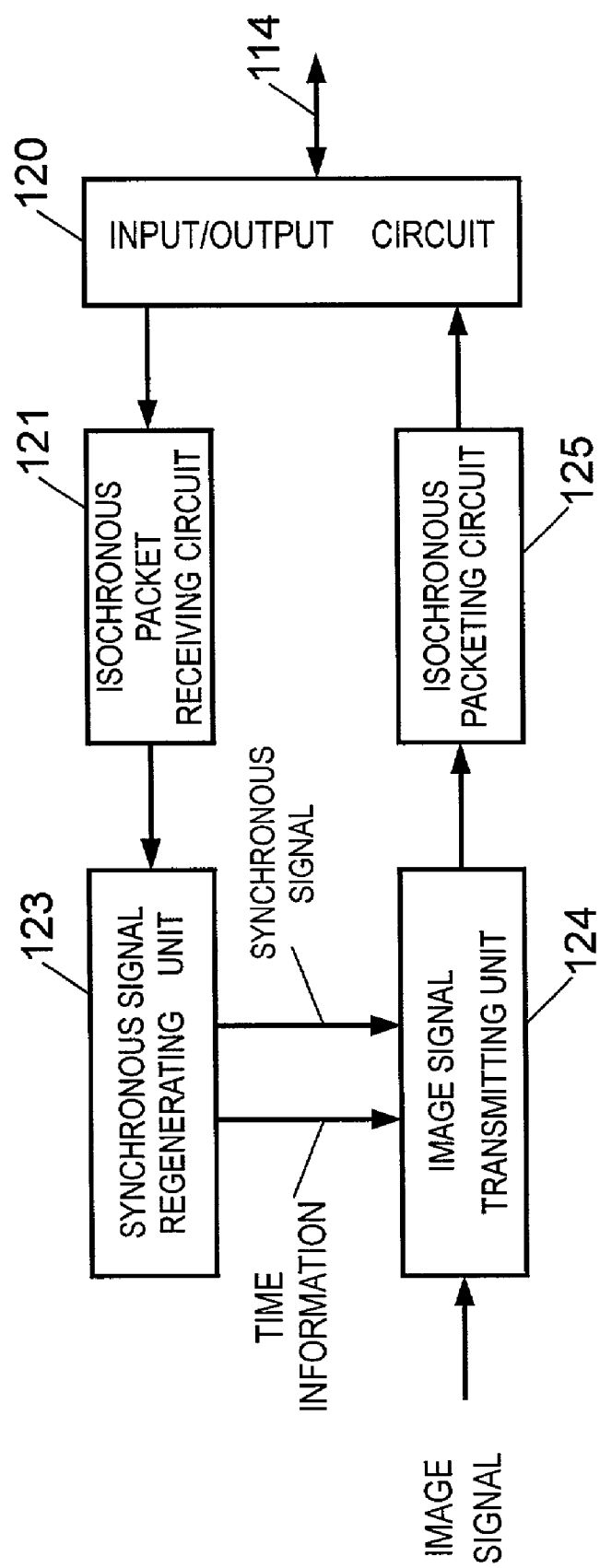
FIG. 15 is a block diagram showing a configuration of camera in embodiment 2.

On the other hand, each camera includes, as shown in FIG. 15, an input/output circuit 120 for input and output of packet data through the DIF 114, an isochronous packet receiving circuit 121 for receiving the isochronous communication packet from the input/output circuit 120, a synchronous signal regenerating unit 123 for regenerating synchronous signal from the received isochronous communication packet, an image signal transmitting unit 124 for issuing an image signal synchronized with the synchronous signal from the synchronous signal regenerating unit 123, and an isochronous packeting circuit 125 for converting the image signal from the image signal transmitting unit 124 to isochronous packet.

For example, when transmitting the video signal of the camera 101 to other node, the image signal of the camera 101 is sent to the DIF 114 by way of the image signal transmitting unit 124, isochronous packeting circuit 125, and input/output circuit 120. In the isochronous packeting circuit 125, the image data is divided into every specific number of bytes so as to be transmitted in one cycle time, and provided with data header showing the type of data, and further provided with information necessary for composing the isochronous communication packet of IEEE1394 standard, and transmitted. This packet is transmitted by using a clock not synchronous with the image signal issued from the image signal transmitting unit 124. On the basis of the image switching control data received by the isochronous communication packet, the image switching is controlled by controlling the input/output circuit 114 of the camera 101.

The input/output circuit 113 of the camera switching device 118 receives the isochronous communication packet provided with the channel number to be received. The channel number is transmitted, for example, from the image switching device in isochronous communication packet, and it is received and given to input/output circuit 113. Frame synchronous signal and image data restored from the received isochronous communication packet are produced as output.

The operation of the camera switching device 118 is same as in embodiment 1 in both transmission and reception, except for the following points: that is, at the time of transmission, the image switching control data issued from the camera switching control unit 106 is fed into the isochronous packeting circuit 117, transmitted to the IEEE1394 bus through the input/output circuit 113 by isochronous packet, and at the time of reception, only the isochronous communication packet to be received from the data entered through the input/output circuit 113 is received in the isochronous packet receiving circuit 111, and the image switching control data is sent into the input/output circuit 113. Accordingly, the receiving channels can be selected in every frame, and the images can be switched over by the receiving channels.

In embodiment 2, the image signal selecting means which is one of constituent elements for composing the invention is mainly composed of the isochronous packet receiving circuit 111 together with the input/output circuit 113. The other constituent elements of the invention such as the image switching means and synchronous signal transmitting means are same as in embodiment 1.

The cameras 101 to 104 are sequentially changed over from the camera switching device 118 in every frame to receive, and a specific camera is received by a specific receiving device (for example, a monitor), and monitored always, and in this case, too, the camera switching control data is transmitted by the same isochronous communication packet as the synchronizing timing signal, and the state of use of the channels is nearly same as in embodiment 1.

As a result, at CH2, the cameras 101, 102, 103, 103 are issued in every frame in this order, and the camera 104 is issued in every frame at CH3. Receiving channels of the camera switching device 118 repeat CH2, CH2, CH2, CH3 as shown in FIG. 12 (4), and the cameras 101 to 104 are sequentially switched in every frame and outputs are made.

In the receiving device 160, by always selecting CH3 as shown in FIG. 12 (6), the output of the camera 104 may be always obtained.

In embodiment 2, the synchronizing timing signal and camera switching control data are both transmitted in broadcast by isochronous packet, but alternatively the synchronizing timing signal may be transmitted in broadcast, and the camera switching control data may be transmitted from the camera switching device to a specific camera one by one, and the synchronizing timing signal and camera switching control data may be transmitted by individual isochronous packet communication, so that the same camera switching as mentioned above may be realized.

Embodiment 3

Figure 16:
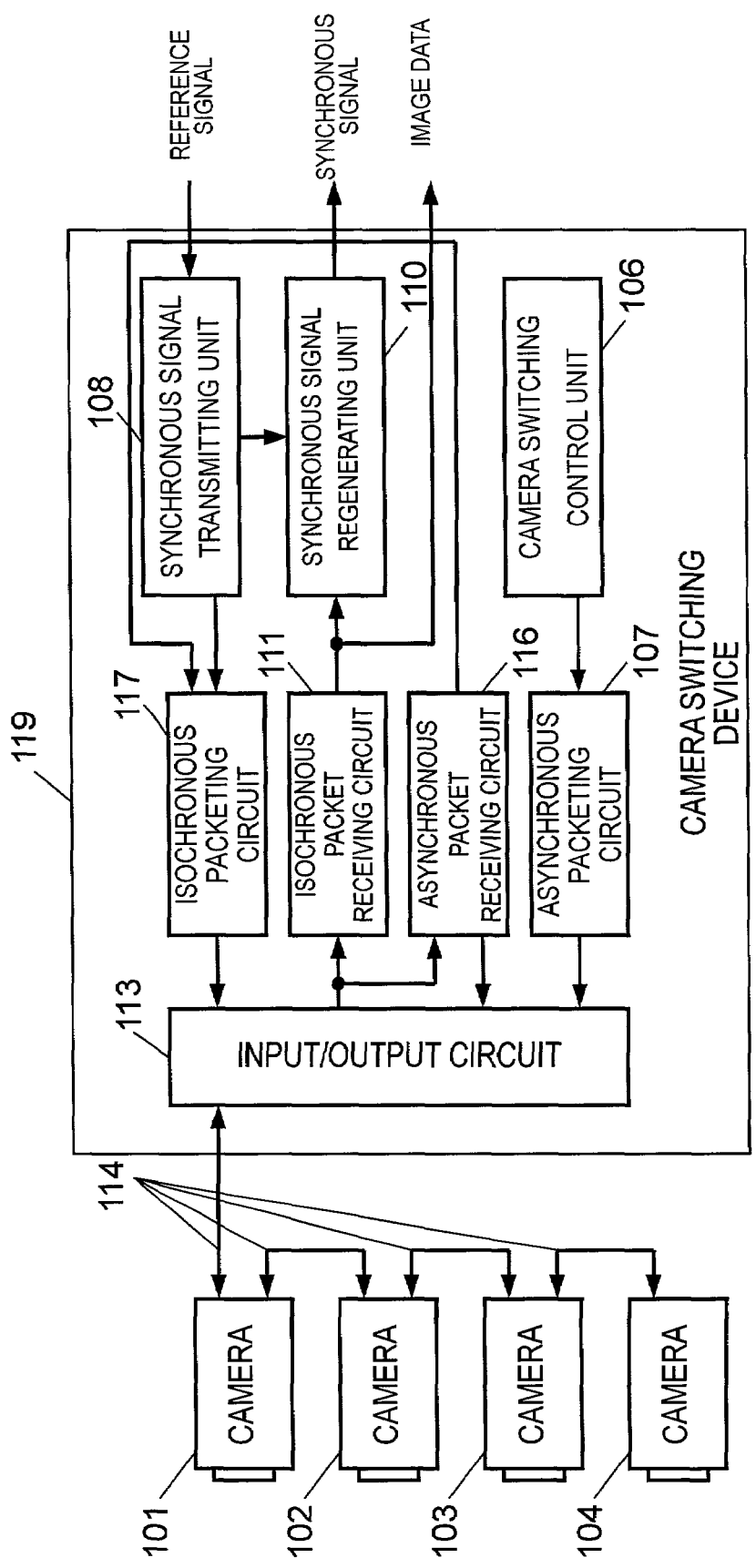
FIG. 16 is a block diagram showing a configuration of image switching device in embodiment 3 of the invention.
Figure 17:
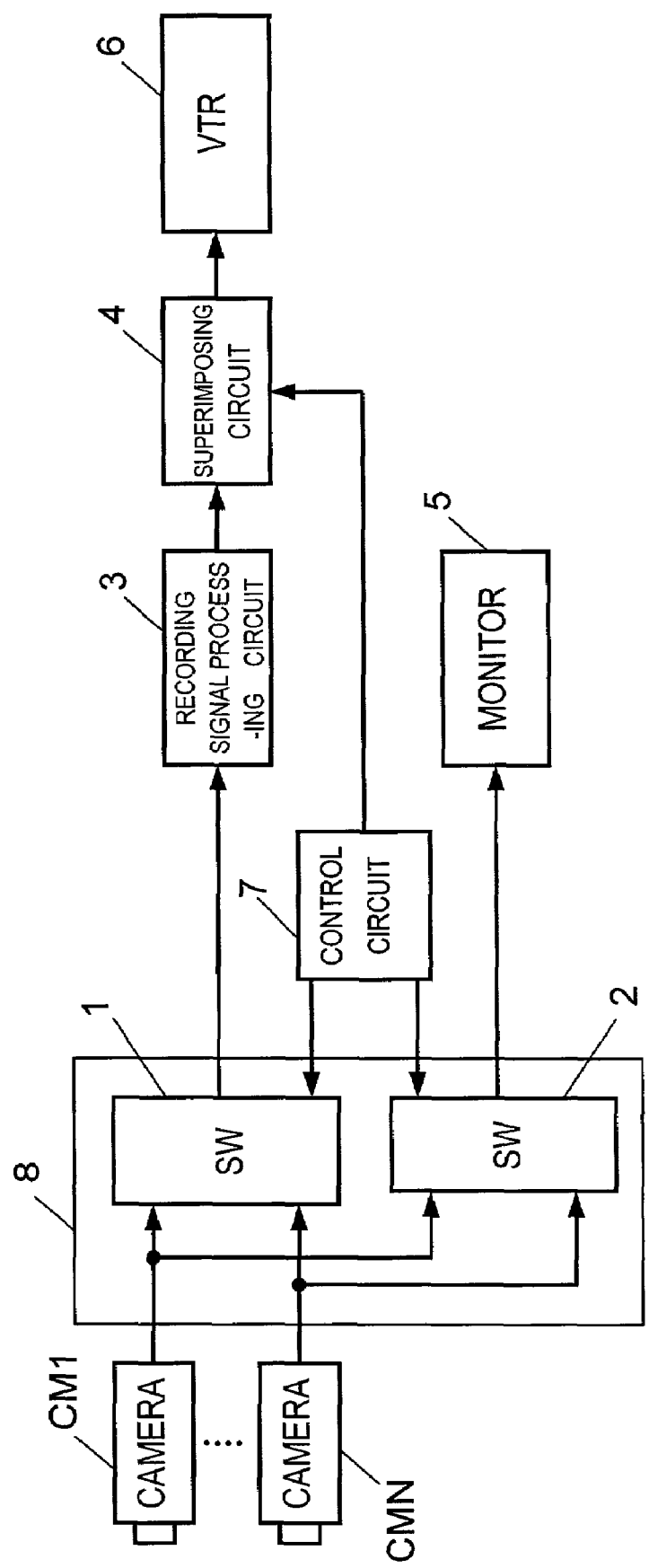
FIG. 17 is a block diagram showing a configuration of a conventional image switching device.

FIG. 16 is a block diagram showing a configuration of cameras and image switching device according to embodiment 3 of the invention. Embodiment 3 is similar to embodiment 1, except that the asynchronous packet receiving circuit 116 supplies the image switching control data from the received asynchronous packet to the isochronous packeting circuit 117, and that the isochronous packeting circuit 117 converts the synchronizing timing signal and image switching control data to isochronous packet, in which four cameras 101 to 104 and camera switching device 119 are connected through the DIF 114. The DIF 114 is an interface conforming to the IEEE1394 standard.

The cameras are same as in embodiment 2 as shown in FIG. 15.

For example, when transmitting the image signal of the camera 101 to other node, the image signal of the camera 101 is sent to the DIF 114 by way of the image signal transmitting unit 124, isochronous packeting circuit 125, and input/output circuit 120. In the isochronous packeting circuit 125, the image data is divided into every specific number of bytes so as to be transmitted in one cycle time, and provided with data header showing the type of data, and further provided with information necessary for composing the isochronous communication packet of IEEE 1394 standard, and transmitted. This packet is transmitted by using a clock not synchronous with the image signal issued from the image signal transmitting unit 124. On the basis of the image switching control data received by the isochronous communication packet, the image switching is controlled by controlling the input/output circuit 114 of the camera 101.

The camera switching device 119 comprises a camera switching control unit 106 for issuing image switching control data for switching the camera, an asynchronous packeting circuit 107 for converting image switching control data to asynchronous communication packet, an isochronous packet receiving circuit 116 for receiving the asynchronous communication packet and supplying image switching control data to the isochronous packeting circuit 117, a synchronous signal transmitting unit 108 for receiving a reference signal (for example, frame synchronous signal) for synchronizing the cameras and transmitting synchronizing timing signal, an isochronous packeting circuit 117 for converting synchronizing timing signal and camera switching control data to isochronous communication packet, an input/output circuit 113 for input and output of packet data through the DIF 114, an isochronous packet receiving circuit 111 for receiving isochronous communication packet from the input/output circuit 113, and a synchronous signal regenerating unit 110 for regenerating synchronous signal from the received isochronous communication packet.

The operation of the camera switching device 119 is same as in embodiment 1 in both transmission and reception, except for the following points: that is, at the time of transmission, the image switching control data issued from the camera switching control unit 106 is fed into the asynchronous packeting circuit 107, transmitted to the IEEE1394 bus through the input/output circuit 113 by asynchronous packet, only the asynchronous communication packet to be received from the data entered through the input/output circuit 113 is received in the asynchronous packet receiving circuit 116, the image switching control data is issued to the isochronous packeting circuit 117, and is transmitted, together with the synchronizing timing signal, to the IEEE1394 bus through the input/output circuit 113 by isochronous packet. As a result, receiving channels can be selected in every frame, and the image is changed over by the receiving channel.

The cameras 101 to 104 are sequentially changed over from the camera switching device 119 in every frame to receive, and a specific camera is received by a specific receiving device (for example, a monitor), and monitored always, and in this case, too, the image switching control data is transmitted by the same isochronous communication packet as the synchronizing timing signal, and the state of use of the channels is exactly same as in embodiment 1.

As a result, at CH2, the cameras 101, 102, 103, 103 are issued in every frame in this order, and the camera 104 is issued in every frame at CH3. Receiving channels of the camera switching device 119 repeat CH2, CH2, CH2, CH3 as shown in FIG. 12 (4), and the cameras 101 to 104 are sequentially switched in every frame and outputs are made.

In the receiving device 160, by always selecting CH3 as shown in FIG. 12 (6), the output of the camera 104 may be always obtained.

In this embodiment, by transmitting the synchronous signal in broadcast to synchronize a plurality of cameras, and selectively receiving the signals from the cameras transmitted through the interface, the image switching device and image outputting device can be presented in a simple configuration.

INDUSTRIAL APPLICABILITY

As described herein, according to the invention, in the digital interface conforming to the IEEE1394 standard, packets containing synchronizing timing signal information are transmitted to each one of a plurality of cameras, image switching control data is transmitted by asynchronous communication packet or isochronous communication packet, and image signals of plural synchronized cameras are selectively received as isochronous communication packet on the basis of the image switching control data, and therefore without having the frame switcher for physically changing over the signal lines of the plurality of cameras, the received images can be switched over on the digital interface.

Further, in the digital interface conforming to the IEEE1394 standard, the stream for recording of monitor camera and the stream for monitor can be transmitted in multiplex, and only by preparing specific receiving devices, recording of monitor camera and monitoring function are can be executed at the same time, and the switcher for two systems for switching the cameras required hitherto is no longer necessary, so that inexpensive image switching device and image outputting device can be presented.

What is claimed is:

1. An image switching device for switching a plurality of image outputting devices connected through a digital interface, and delivering image signals, comprising:
   image switching control means for sending image switching control data for selecting and controlling a desired device out of the plurality of image outputting devices to the selected image outputting device;
   image signal selecting means for selecting and receiving the image signal transmitted from the selected image outputting device according to the image switching control data; and
   synchronous signal transmitting means for transmitting a synchronizing timing signal for synchronizing the image outputting devices, wherein
   the digital interface conforms to the IEEE 1394 standard, and the synchronizing timing signal and image signal to be transmitted are transmitted by isochronous communication packet.

2. The image switching device of claim 1, wherein in addition to the synchronizing timing signal and image signal, the image switching control data of image outputting devices to be transmitted is transmitted by isochronous communication packet.

3. An image switching device for switching a plurality of image outputting devices connected through a digital interface, and delivering image signals, comprising:
   image switching control means for sending image switching control data for selecting and controlling a desired device out of the plurality of image outputting devices to the selected image outputting device;
   image signal selecting means for selecting and receiving the image signal transmitted from the selected image outputting device according to the image switching control data; and
   synchronous signal transmitting means for transmitting a synchronizing timing signal for synchronizing the image outputting devices, wherein
   the digital interface conforms to the IEEE1394 standard,
   the synchronizing timing signal and image signal to be transmitted are transmitted by isochronous communication packet, and
   the image switching control data of image outputting devices to be transmitted is transmitted by an asynchronous communication packet to the synchronous signal transmitting means, and is transferred by isochronous communication packet together with the synchronizing timing signal.

4. The image switching device of claim 1, 2 or 3, wherein the synchronizing timing signal and image switching control data of image outputting devices are transmitted at least by either an isochronous communication packet not containing image data or an asynchronous communication packet.

5. The image switching device of claim 1, wherein the image switching control data of image outputting devices is transmitted by an asynchronous communication packet.

6. The image switching device of claim 1, 2 or 3, wherein the synchronizing timing signal is transmitted to all of the plurality of image outputting devices.

7. The image switching device of claim 1, 2 or 3, wherein the synchronizing timing signal is transmitted in a specific channel to plural image outputs.

* * * * *